United States Patent
Germanetti

[19]

[11] Patent Number: 5,831,429
[45] Date of Patent: Nov. 3, 1998

[54] SYSTEM FOR DETECTING AND MONITORING THE ROTATIONAL SPEED OF AT LEAST ONE ROTOR AND THE ROTATIONAL SPEED OF AT LEAST ONE MOTOR OF A ROTARY-WING AIRCRAFT, SUCH AS A HELICOPTER

[75] Inventor: Serge Alexandre Germanetti, Marseille, France

[73] Assignee: Eurocopter France, Marignane Cedex, France

[21] Appl. No.: 658,672

[22] Filed: Jun. 4, 1996

[30] Foreign Application Priority Data

Jun. 8, 1995 [FR] France ................................. 95 06759

[51] Int. Cl.⁶ ..................................................... G01P 3/56
[52] U.S. Cl. ...................... 324/161; 324/173; 324/207.12
[58] Field of Search ........................ 324/207.12–207.17, 324/207.25, 236, 239, 161, 166, 173, 174, 202, 76.52, 76.41

[56] References Cited

U.S. PATENT DOCUMENTS 3,826,985  7/1974  Wiley ....................................... 324/173

4,179,938  12/1979  Schramm ................................... 73/510

FOREIGN PATENT DOCUMENTS

3736110 A1  5/1989  Germany .
2057693  4/1981  United Kingdom .
2058358  4/1981  United Kingdom .

*Primary Examiner*—Sandra L. O'Shea
*Assistant Examiner*—Jay M. Patidar
*Attorney, Agent, or Firm*—Watson Cole Stevens Davis, P.L.L.C.

[57] ABSTRACT

The system detects and monitors the rotational speed $N_R$ of a rotor and the rotational speed $N_{TL}$ of a motor of a helicopter and includes first and second devices for detecting $N_R$ and $N_{TL}$, and delivering signals to first and second processing units which are connected to a display unit for displaying $N_R$ and $N_{TL}$. The second processing unit includes an electronic processing unit which receives the signals relating to $N_{TL}$ and the signals relating to $N_R$ and which is capable of comparing the values of $N_R$ and $N_{TL}$ in such a way that, if the difference between the values of $N_R$ and $N_{TL}$ is less than or equal to a predetermined threshold, the second processing unit controls the display of $N_R$ and $N_{TL}$ such that $N_R$ and $N_{TL}$ are aligned on the display unit.

11 Claims, 1 Drawing Sheet

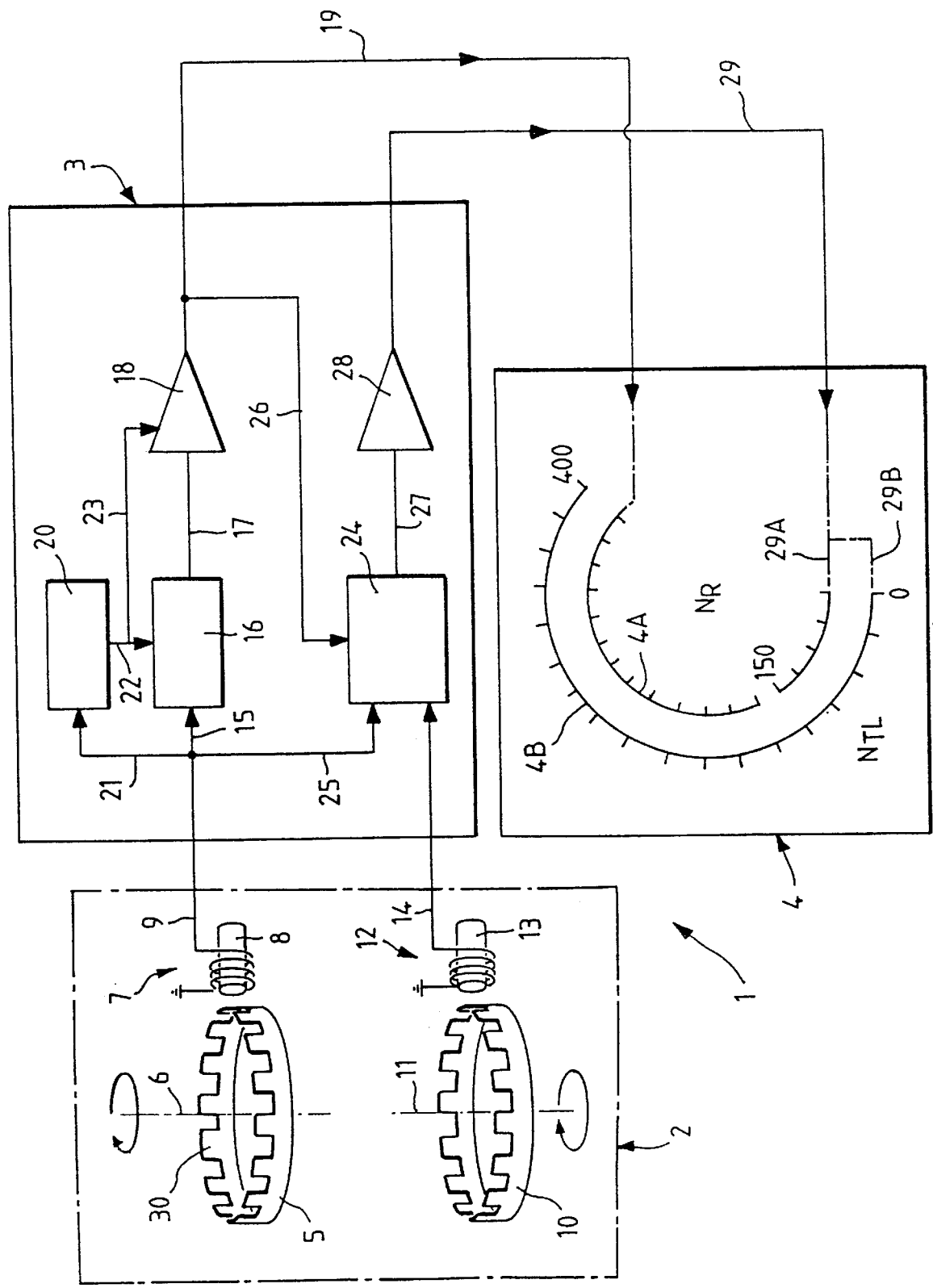

SYSTEM FOR DETECTING AND MONITORING THE ROTATIONAL SPEED OF AT LEAST ONE ROTOR AND THE ROTATIONAL SPEED OF AT LEAST ONE MOTOR OF A ROTARY-WING AIRCRAFT, SUCH AS A HELICOPTER

FIELD OF THE INVENTION

The present invention relates to a system for detecting and monitoring the rotational speed of at least one rotor and the rotational speed of at least one motor of a rotary-wing aircraft, such as a helicopter.

BACKGROUND OF THE INVENTION

For various reasons which are set out below, in a rotary-wing aircraft such as a helicopter, it is necessary to detect, on the one hand, the rotational speed of the rotor, in the main gearbox, and, on the other hand, the rotational speed of the motor or motors (free turbine), and to display this information on the instrument panel in the cockpit. In a single-motor helicopter, a single indication ($N_R$) for the number of revolutions per minute of the rotor (rotational speed of the rotor) and a single indication ($N_{TL}$) for the number of revolutions per minute of the single free turbine (rotational speed of the turbine) are detected and displayed. If the helicopter is a two-motor craft, one indication $N_R$ and two indications $N_{TL}$ will, of course, be delivered. For a three-motor helicopter, there would be four indications, etc.

Conventionally, the rotational speed (number of revolutions per minute) for the rotor ($N_R$) as for the free turbine ($N_{TL}$) can be detected using a toothed wheel, linked in rotation with the rotor (or with the turbine), and associated with an electromagnetic sensor consisting of a permanent magnet and a winding. The flux is a maximum when a tooth of the wheel is in front of the sensor, whereas the flux is a minimum when a notch is in front of the sensor. A flux variation which induces an electrical pulse is thus produced each time a tooth passes. The electrical pulses have a frequency f equal to the number of flux variations per second, that is to say $f=(N_R \times n)/60$. Since n, the number of teeth, is constant, the frequency of the signal is proportional to $N_R$. The signals are sent to a frequency/voltage converter connected to a galvanometer. The principle for measuring the rotational speed of the free turbine ($N_{TL}$) or, optionally, of the gas generator ($N_G$) is the same.

In such conventional systems, for example in the case of a single-motor craft, the rotational speed indicator is equipped with two needles, one for each of the parameters $N_R/N_{TL}$, and operates in such a way that these two needles should be aligned (superposed) during normal flight. A misalignment of these needles indicates that there is a mechanical problem, either in the motor or in the main gearbox for transmitting mechanical power to the rotor, or else a transmission shaft break or a main gearbox slip, amongst other things.

Currently, the indications $N_R$ and $N_{TL}$ are graduated in such a way that, to within the demultiplication ratio, the two (or more) graduations face each other when the motor or motors are engaged on the main gearbox. In this regard, it will be noted that $N_R$, in normal operation, is between approximately 200 rpm and 400 rpm, depending on the diameter of the rotor (blade tip speed V≦220 m/s), with a low-power turbine engine often rotating at approximately 35000 rpm, the constructor generally delivering it, using an incorporated reducer, with a power take-off at approximately 6000 rpm.

However, when starting and stopping the turbine engine, the movement of the two needles of the double indicator is not at all simultaneous, for the reasons indicated below and, in particular, the presence of a clutch. (On the other hand, if a misalignment appears in flight, this may possibly be due to premature wear or another reason).

In fact, the two needles of such a double indicator are moved by galvanometers whose measuring systems do not have exactly the same precision, which results in a slight misalignment associated with the measurements and not with the power transmission assembly. If this misalignment becomes too great, the flight crew may interpret it as, for example, an anomaly in the turbine engine, or another mechanical anomaly. In order to avoid this, it is necessary to calibrate and adjust these apparatuses on the aircraft, which leads to time-consuming operations that generate corresponding costs.

For safety reasons, it is currently recommended to use an autonomous indicator of $N_R$. For example, it is possible to recover energy from the rotation of the abovementioned toothed wheel associated with the electromagnetic sensor and driven by the rotation of the rotor.

Another solution could consist in using two very precise measuring systems for $N_R$ and $N_{TL}$, this being in order to avoid any error. However, this produces two drawbacks:

cost, a very precise system is not necessarily autonomous.

It will be noted that the term "very precise system" is intended to mean a system based on galvanometers slaved with precision feedback, which require a non-negligible level of power.

Consequently, use has to date been made of a system based on a simple autonomous galvanometer for measuring $N_R$, in the first system, and of a slaved galvanometer for measuring $N_{TL}$, in the second system. However, this results in adjustment problems, making it necessary to balance the needles, when tuning the apparatuses, using suitable potentiometers for carrying out said adjustments.

It will be noted that, if there is no more normal power supply on board the aircraft, the energy delivered by the batteries generally remains in reserve. However, it is found that, with a system based on galvanometers, since the batteries discharge during an emergency flight lasting of the order of a half hour, fixed by standards, a particular potential risk exists. Thus, during such flights, the flight crew could see the indications of $N_R$ and $N_{TL}$ decrease, if neither one of them is autonomous, because of a drop in battery power. Noting the decrease in $N_R$, the flight crew could interpret this fact as a progressive jamming of the rotor. Since $N_{TL}$ decreases simultaneously, but without the motor being in malfunction ($_G$, the revolution number of the gas generator, having a similar value), the flight crew could attribute the malfunction to jamming of the main gearbox, leading to the implementation of an autorotation emergency landing procedure which could have been avoided. Autonomy of the system relating to the measurement of $N_R$ therefore seems necessary.

Currently, since the needle of a simple galvanometer does not operate with position feedback, in particular in the measurement of $N_R$, where it should be positioned is not known exactly, and therefore how to drive the needle corresponding to $N_{TL}$ correctly in order to bring it toward the former needle and eliminate the differences by a suitable adjustment is not known, even if the measurement of $N_{TL}$ is originally precise. In practice, it cannot be confirmed that the reproduction of $N_R$ by the needle corresponds to the command given.

SUMMARY OF THE INVENTION

The object of the present invention is to overcome this drawback.

To this end, the system for detecting and monitoring the rotational speed $N_R$ of at least one rotor and the rotational speed $N_{TL}$ of at least one motor of a rotary-wing aircraft, such as a helicopter, including first and second means for detecting said rotational speeds $N_R$ and $N_{TL}$, respectively, delivering signals relating to said speeds to first and second respective means for processing said signals, which are connected to means for displaying indications relating to said rotational speeds $N_R$ and $N_{TL}$, is noteworthy, according to the invention, in that said second processing means comprise an electronic processing unit which receives, on the one hand, the signals relating to the rotational speed $N_{TL}$ and, on the other hand, the signals relating to the rotational speed $N_R$, and in that said unit is capable of comparing the values of $N_R$ and $N_{TL}$ in such a way that, if the difference between the values of $N_R$ and $N_{TL}$ is less than or equal to a predetermined threshold, said unit controls the display of $N_R$ and $N_{TL}$ such that $N_R$ and $N_{TL}$ are aligned on said display means.

Thus, by virtue of the possibility of using said electronic processing unit to align the value of $N_{TL}$ with the value of $N_R$ (of course, under conditions which are otherwise normal), the system according to the invention makes it possible to decouple possible inaccuracies in the measurements from mechanical malfunctions or incidents which may occur.

Advantageously, said electronic processing unit receiving, on the one hand, the value of $N_R$ at the input of said first processing means and, on the other hand, the value of $N_R$ at the output of said first processing means, said unit is capable of comparing said two values so as, when appropriate, to deliver a malfunction signal.

Preferably, said display means consist of a liquid-crystal indicator, in particular with so-called dedicated liquid crystals.

The system according to the invention thus advantageously comprises an indicator with dedicated crystals which are driven by a microprocessor (the electronic processing unit), that is to say having segments which are illuminated as the value of the corresponding information ($N_R$ or $N_{TL}$) increases, which is manifested by graduations which illuminate progressively, assisting the solution to the alignment problem. By adjustment, each segment may correspond to 2 or even 3 rpm of the rotor, that is to say of the order of magnitude of the precision required for correct piloting of a helicopter.

According to another feature of the invention, in this case the system comprises first and second respective means for driving said indicator, which are provided between said first and second processing means, respectively, and said indicator.

Moreover, said first and second detection means each may comprise a toothed wheel, linked in rotation with the rotor or the motor, associated with an electromagnetic sensor.

Preferably, said first processing means, comprising a counter for the teeth of said wheel, are then autonomously supplied with electrical energy recovered at said wheel or said sensor. The recovered energy may also supply said first drive means.

According to yet another feature of the invention, at low speed, the rotational speed $N_R$ is displayed by means of said electronic processing unit, the power delivered by the autonomous supply then being insufficient (between 0 and 150–200 rpm).

One of the teeth of the wheel associated with the detection of $N_R$ may further have a different characteristic from the other teeth, in particular a larger active surface, thus delivering a signal which is usable, for example, for rig-based dynamic adjustment work on the main rotor, or a signal coupled to a stroboscopic observation, or any other known means, this being carried out in flight for work subsequent to the dynamic balancing adjustment of the rotor on the ground.

BRIEF DESCRIPTION OF THE DRAWINGS

The single FIGURE of the appended drawing will clearly explain how the invention may be embodied.

The sole FIGURE shows a detecting and monitoring system according to an embodiment of the present invention.

DESCRIPTION OF THE PREFERRED EMBODIMENTS

The FIGURE schematically shows an illustrative embodiment of a system 1 according to the invention which relates, by way of example, to the case of a rotary-wing aircraft, in particular a helicopter, having a single main rotor and a single motor (turbine). Of course, as already seen, the system according to the invention can be generalized in the case of an aircraft having a plurality of motors (a plurality of values of $N_{TL}$) and, optionally, two rotors (two values of $N_R$). The use of other parameters, in particular associated with the motor, such as $N_G$ mentioned above could also be envisaged.

In general, the system 1 for detecting and monitoring the rotational speed ($N_R$) of the rotor and the rotational speed ($N_{TL}$) of the motor of the aircraft comprises an assembly 2 for detecting said rotational speeds $N_R$ and $N_{TL}$, delivering signals relating to said speeds to an assembly 3 for processing said signals, which is connected to means 4 for displaying indications relating to said rotational speeds of the rotor ($N_R$) and of the motor ($N_{TL}$). According to the invention, said display means 4 consist of a liquid-crystal indicator whose screen has two zones 4A and 4B for displaying $N_R$ and $N_{TL}$, respectively, having a certain number of segments for the display, as will be seen in more detail below.

More precisely, the detection assembly 2 includes a first toothed wheel 5, linked in rotation with the rotor of the aircraft, symbolized by the axis 6, said toothed wheel being associated with an electromagnetic sensor 7 consisting of a permanent magnet 8 and a winding 9. Similarly, a second toothed wheel 10, linked in rotation with the output shaft of the motor (turbine) of the aircraft, symbolized by the axis 11, is associated with an electromagnetic sensor 12 consisting of a permanent magnet 13 and a winding 14. As already indicated, the speed detection is based on the variation in the magnetic flux, inducing electrical pulses (the signals delivered to the processing means 3) depending on whether, as the wheel rotates, the sensor is in front of a tooth or the notch between two teeth.

The processing assembly 3 further essentially includes two "channels" or "systems" for processing the signals output by the detection means 2. A first channel, connected to the sensor 7 for the rotational speed $N_R$ of the rotor by the link 15, has a first electronic processing unit 16. In fact, the toothed wheel 5 which is linked in rotation with the rotor, that is to say located at the main gearbox, comprises a large number of teeth (for example 80) and, in order to calculate the rotational speed $N_R$, it is sufficient to use the unit 16 to count the teeth passing in front of the sensor over a predetermined period (corresponding to one or two revolutions of the rotor), this number of teeth then directly corresponding to the number of segments to be displayed on the indicator 4 (each segment being equivalent, for example, to 3 revolutions per minute, which constitutes the required performance). This counting, advantageously carried out with a sliding memory, may also provide the filtering associated with variations in the rotational speed of the rotor. In this case, instead of displaying the value of $N_R$ which has just been indicated, the use of a mean, calculated on the basis of various values of $N_R$, may be envisaged. Four consecutive values (four successive counts) may, for example, be stored in memory and added. The sliding memory principle therefore consists in using a certain number of counts "updated" at the end of a predetermined time interval. This is a kind of first order filtering, with predetermined time constant, which eliminates the requirement of more complex filtering which needs an advanced microprocessor with high power consumption.

The unit 16 is connected, by a link 17, to first means 18 for driving the liquid-crystal diodes of that zone 4A of the indicator 4 which relates to the displaying of $N_R$ and to which the drive means 18 are connected by the link 19. Since it is highly advantageous for this channel to be autonomous, that is to say for it not to depend on an external electrical supply (general supply of the aircraft, batteries) energy recovery, 20 device, is provided which is tapped at the output of the sensor 7 (link 21) or, optionally, from the rotation of the wheel 5 and supplies, on the one hand, the tooth counter 16 (low power consumption) via the link 22 and, on the other hand, the drive means 18 via the link 23.

The second channel, connected to the sensor 12, has a second electronic processing unit (microprocessor) 24. The principle for processing the signals output by the sensor 12 remains the same as before. However, the microprocessor 24 has a certain number of other functions, explained below, and for this purpose, it is connected, as shown, to the output of the sensor 7 (link 25) and to the output of the drive means 18 (link 26). As before, the microprocessor 24 is connected, by a link 27, to second means 28 for driving the liquid-crystal diodes of the zone 4B ($N_{TL}$ display) and to a part of the zone 4A (low speed) to which the drive means 28 are connected by the link 29.

A slightly more complex arrangement is thus used on the channel corresponding to $N_{TL}$ than on the $N_R$ channel, using a microprocessor. It is not necessary for such a channel or system to be autonomous because, subsequent to an accidental loss of electrical power supply on board the aircraft and in the event of motor malfunction, the indication relating to $N_{TL}$ becomes useless since the motor(s) no longer function(s) normally. In contrast, the indication relating to $N_R$ becomes indispensable for piloting the aircraft (helicopter) in autorotation flight (the only flight mode which is then possible). This is because it is known that the first act to be performed in this case is to depress the collective pitch lever to "smallest pitch" (otherwise the rotor speed decreases, the centrifugal force and the lift decrease even more rapidly, the blades become unbalanced and the craft is no longer controllable) and to immediately check the rotor speed. Optionally, the nose of the craft can be pulled up if the speed is too low or some collective pitch can be applied if it is too high.

In order for the first channel ($N_R$) to be autonomous (sufficient power supply) it is necessary for the rotor to rotate at approximately 150–200 rpm (50% of maximum speed). Below these values, that is to say between 0 and 150 rpm, the microprocessor 24, using the information collected via the links 25 and 26 and by using the drive means 28, displays the values of $N_R$ (link 29A) for these values, in addition to its "normal" function of displaying the values of $N_{TL}$ (link 29B). Above this threshold, the autonomous channel delivers the information relating to $N_R$ and the nonautonomous channel delivers the information relating to $N_{TL}$. If the difference is less, for example, than 5 rpm, expressed in number of revolutions of the rotor, the two information items are displayed side by side [graduations (segments) illuminated to the same level] using the processor 24. In other words, as stated above, they are aligned on the indicator 4. In practice, prior adjustments using, in particular, potentiometers are no longer necessary, which saves a considerable amount of time.

The indicator 4 for $N_R/N_{TL}$ is equipped with liquid crystals, advantageously based on the so-called "dedicated crystal" technology, which is preferred to that of active matrices. This is because the latter drives each point on a screen. Consequently, if a malfunction occurs on this screen, it may be produced either on one or other of the two information items $N_R$ and $N_{TL}$, or on both, which would of course be detrimental to the safety of the system. For its part, the so-called "dedicated crystal" technology makes it possible to improve this situation. A certain number of points are in fact predefined in this case for representing a symbology (segments). The $N_R$ information therefore becomes independent from the $N_{TL}$ information. In addition, by virtue of one microprocessor which is "dedicated" to driving the $N_R$ segments and another to the $N_{TL}$ segments, the two systems relating to $N_R$ and $N_{TL}$, respectively, are practically independent. This technology further makes it possible to dissociate the "low speed" segments of $N_R$ (below 150–200 rpm) from the other segments by driving the "low speed" segments of $N_R$ using the microprocessor 24, for example on start-up, then by driving the other segments autonomously. This result is impossible to obtain using a galvanometer.

On the $N_R/N_{TL}$ indicator, it is also possible to provide a very precise numerical indication of $N_R$ (that is to say to within less than one revolution per minute) from the numerical value of $N_R$ transmitted by the link 29.

Further, the segments of the indicator are located on a panel, arranged in a lens, which polarizes, and opens then closes, allowing light to pass through the opening. The means 18 and 28 for driving the liquid crystals therefore constitute an electronic apparatus which opens and closes these windows. There is consequently a direct relationship between the number of segments illuminated and the open and close command from said drive means.

By recovering the corresponding open and close commands at the output of the first drive means 18, associated with the autonomous channel for detecting and displaying $N_R$, and sending them to the second electronic processing unit 24 associated with the (nonautonomous) channel for detecting and displaying $N_{TL}$, said unit is provided with three information items:

$N_R$ (as seen above, via the link 25), $N_{TL}$, and the displayed value of $N_R$, at the output of the autonomous system (link 26).

Unit 24 can thus:

using the output of the autonomous system, monitor whether the displayed value of $N_R$ is indeed similar to the value which it receives directly (link 25) and optionally deliver a malfunction signal if a substantial difference exists between these two values, and insofar as the systems are accurate to ±3 rpm, decide to illuminate the segments corresponding to $N_{TL}$ exactly next to the ones illuminated for $N_R$, if the two signals $N_R$ and $N_{TL}$ have a difference less than or equal to 3 rpm, whence perfect alignment of the segments on the dial of the indicator 4.

If it is desired to indicate a malfunction to the pilot starting from a difference of 5 rpm (for example), said unit is then forced to display this difference by illuminating one segment more or less for $N_R$.

The unit can thus distinguish between the performance of the measuring system and the possible slip, for example, in the main gearbox, indicating a mechanical problem with the latter. This results in automatic interpretation and monitoring.

In other words, said second electronic processing unit 24 has the function of processing the signal $N_R$ and the signal $N_{TL}$, comparing the signals $N_R$ and $N_{TL}$ in order to detect malfunctions, and acquiring the result of the processing of the autonomous channel so as to check that the display of $N_R$ is correct.

If $N_{TL}$ (calculated) is close to $N_R$ (autonomous), $N_{TL}$ is aligned with the exact value of $N_R$ displayed on the autonomous channel. If the difference, expressed in numbers of rotor revolutions per minute, is greater than a threshold, the difference is demonstrated by displaying $N_{TL}$ (calculated) and $N_R$ (autonomous) with an offset of one $N_{TL}$ segment. If $N_R$ (calculated) is different from $N_R$ (autonomous), a malfunction message is displayed.

One tooth 30 of the wheel 5 associated with detecting the rotational speed of the rotor $N_R$ has a different characteristic from the others: different leading edge or else, as represented, larger active surface, in particular.

When this particular tooth 30 moves past, the microprocessor observes a flux blockage and an unusual current variation. It then emits on one of its output channels a signal which corresponds to the signal constructed by a suitable instrument hitherto used when the blades of a rotor pass through a predetermined azimuthal position. The result of this is to save weight and space, since said instrument is no longer necessary. This information, available to the user at the output of the microprocessor, can be analyzed, for example, during rig-based dynamic adjustment work on the main rotor. It is therefore an integrated tool. It will be noted in this regard that the use of a conventional galvanometer would in this case be inconceivable in view of the disturbance to the movement of the needle when the particular tooth passes in front of the sensor.

The electronic processing unit may further have another output line for delivering any suitable information to an external computer for forming calculations for checking the condition of the motor, or a different use as required: maintenance, malfunction condition (functions or components).

In order to increase the power level, the sensor 7 may be modified, allowing a sinusoidal variation in the current between levels $+i_{max}$ and $-i_{max}$ by adding a magnet to it, on either side and at a short distance from it, the assembly having to be designed so that it is either in front of a tooth on the wheel or in front of a tooth gap, according to the rotation of this wheel. Other higher performance sensors may be envisaged, subject to weight and space constraints.

It will further be noted that the dedicated crystals may correspond to two techniques, either transmissive or reflective. In the first case, they are illuminated on the rear face of the instrument, so that when the crystal opens, the segment is shown under the effect of this illumination. Although, for its part, this technique consumes little power, it requires additional illumination. In order to ensure daytime autonomy, the back light should itself be supplied autonomously, which introduces a further complication.

In the second case, the dedicated crystals reflect daylight, and the segment which is in the open position causes the appearance of a zone which is, for example, black in the background. When closed, it reflects light toward the observer. It is therefore sufficient to have direct illumination by daylight, or by a backup lamp if the illumination is insufficient or absent. The electrical consumption is, however, slightly greater than in the first case because the segments are more "efficient".

In practice, the use of a hybrid solution is proposed, using a reflector which "functions" both in transmission mode and in reflection mode. Under these conditions, a cumulative effect is obtained of natural light and back light which "dopes" the signal so as to make the indicator very luminous in normal operating mode, while in backup mode (without back illumination), the display is less luminous, but without impairing safety.

It is further suitable to select a so-called TN ("twist nematic") or dichroic technology so as to improve the contrast without consuming current for illuminating the indicator. Only the viewing angles and the contrast which are obtained depend on the technology selected.

I claim:

1. A system for detecting and monitoring the rotational speed $N_R$ of at least one rotor and the rotational speed $N_{TL}$ of at least one motor of a rotary-wing aircraft, such as a helicopter, including first and second means for detecting said rotational speeds $N_R$ and $N_{TL}$, respectively, delivering signals relating to said speeds to first and second respective processing means for processing said signals, which are connected to display means for displaying indications relating to said rotational speeds $N_R$ and $N_{TL}$, wherein said second processing means comprise an electronic processing unit which receives, on the one hand, the signals relating to the rotational speed $N_{TL}$ and, on the other hand, the signals relating to the rotational speed $N_R$, and wherein said second processing means include means for comparing the values of $N_R$ and $N_{TL}$ in such a way that, if the difference between the values of $N_R$ and $N_{TL}$ is less than or equal to a predetermined threshold, said second processing means control the display of $N_R$ and $N_{TL}$ such that $N_R$ and $N_{TL}$ are aligned on said display means.

2. The system as claimed in claim 1, wherein, said electronic processing unit receives, on the one hand, the value of $N_R$ at the input of said first processing means and, on the other hand, the value of $N_R$ at the output of said first processing means, said electronic processing unit comprising means for comparing said two values so as to, when appropriate, deliver a malfunction signal.

3. The system as claimed in claim 1, wherein said display means comprises a liquid-crystal indicator.

4. The system as claimed in claim 3, wherein liquid crystals of said liquid crystal indicator are so-called dedicated crystals.

5. The system as claimed in claim 3, further comprising first and second respective drive means for driving said indicator, said first and second drive means being provided between said first and second processing means, respectively, and said indicator.

6. The system as claimed in claim 1, wherein said first and second detection means each comprise a toothed wheel, linked in rotation with the rotor or the motor, associated with an electromagnetic sensor.

7. The system as claimed in claim 6, wherein said first processing means include a counter for counting teeth of said wheel and are autonomously supplied with electrical energy recovered at said wheel or said sensor.

8. The system as claimed in claim 7, wherein the recovered energy supplies said first drive means.

9. The system as claimed in claim 7, wherein, at low speed, the rotational speed $N_R$ is displayed by means of said electronic processing unit.

10. The system as claimed in claim 6, wherein one of the teeth of the wheel associated with the detection of $N_R$ has a different characteristic from the other teeth.

11. The system as claimed in claim 6, wherein said different characteristic comprises a larger active surface.

* * * * *